(12) United States Patent
Xie et al.

(10) Patent No.: US 7,226,548 B2
(45) Date of Patent: Jun. 5, 2007

(54) SYNGAS CATALYSTS AND THEIR METHOD OF USE

(75) Inventors: Shuibo Xie, Ponca City, OK (US); Chad M. Ricketson, Stillwater, OK (US); David M. Minahan, Stillwater, OK (US); Yaming Jin, Ponca City, OK (US); Harold A. Wright, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 508 days.

(21) Appl. No.: 10/706,644

(22) Filed: Nov. 12, 2003

(65) Prior Publication Data

US 2005/0261383 A1 Nov. 24, 2005

Related U.S. Application Data

(60) Provisional application No. 60/501,185, filed on Sep. 8, 2003, provisional application No. 60/425,383, filed on Nov. 11, 2002, provisional application No. 60/425,381, filed on Nov. 11, 2002.

(51) Int. Cl.
*C01B 3/40* (2006.01)
(52) U.S. Cl. ..................................... 252/373
(58) Field of Classification Search ................. 252/373
See application file for complete search history.

(56) References Cited

U.S. PATENT DOCUMENTS

| | | | |
|---|---|---|---|
| 3,718,418 A | 2/1973 | Fleming et al. | 423/415 |
| 3,752,775 A | 8/1973 | Yamaguchi et al. | 252/464 |
| 4,151,123 A | 4/1979 | McCann, III | 252/462 |
| 4,537,873 A | 8/1985 | Kato et al. | 502/242 |
| 4,585,752 A | 4/1986 | Ernest | 502/314 |
| 4,738,946 A | 4/1988 | Yamashita et al. | 502/303 |
| 4,793,797 A | 12/1988 | Kato et al. | 143/7 |
| 4,844,837 A * | 7/1989 | Heck et al. | 252/373 |

(Continued)

FOREIGN PATENT DOCUMENTS

EP 0 629 578 B1 8/2000

(Continued)

OTHER PUBLICATIONS

Brooks, et al., "Synthesis Of Highly Dispersed Supported Metal Catalyst Via Chemical Dissolution And Precipitation Of Eutectic Alloys," *Surface Technology*, (1980), vol. 11, pp. 333-347, no month.

(Continued)

*Primary Examiner*—Wayne A. Langel
(74) *Attorney, Agent, or Firm*—Conley Rose P.C.

(57) ABSTRACT

The present invention relates to improved catalyst compositions, as well as methods of making and using such compositions. Preferred embodiments of the present invention comprise catalyst compositions having high melting point metallic alloys, and methods of preparing and using the catalysts. In particular, the metallic alloys are preferably rhodium alloys. Accordingly, the present invention also encompasses an improved method for converting a hydrocarbon containing gas and an atomic oxygen-containing gas to a gas mixture comprising hydrogen and carbon monoxide, i.e., syngas, using the catalyst compositions in accordance with the present invention. In addition, the present invention contemplates an improved method for converting hydrocarbon gas to liquid hydrocarbons using the novel syngas catalyst compositions described herein.

38 Claims, 3 Drawing Sheets

U.S. PATENT DOCUMENTS

| | | | | |
|---|---|---|---|---|
| 4,863,707 | A | * | 9/1989 | McShea et al. ............. 423/359 |
| 4,927,857 | A | * | 5/1990 | McShea et al. ............. 518/703 |
| 4,961,786 | A | | 10/1990 | Novinson ................... 106/692 |
| 5,023,276 | A | * | 6/1991 | Yarrington et al. ......... 518/703 |
| 5,268,157 | A | | 12/1993 | Blass et al. ................. 423/403 |
| 5,736,482 | A | | 4/1998 | Durand et al. .............. 502/303 |
| 5,837,634 | A | | 11/1998 | McLaughlin et al. ....... 501/127 |
| 6,015,285 | A | | 1/2000 | McCarty et al. ............... 431/7 |
| 6,277,894 | B1 | | 8/2001 | Agee et al. ................. 518/700 |
| 6,399,528 | B1 | | 6/2002 | Krell et al. ................... 501/80 |
| 6,409,940 | B1 | * | 6/2002 | Gaffney et al. ............. 252/373 |
| 6,455,597 | B2 | | 9/2002 | Hohn et al. ................. 518/715 |
| 6,702,960 | B1 | * | 3/2004 | Schaddenhorst et al. .... 252/373 |
| 6,746,658 | B2 | * | 6/2004 | Dindi et al. ................ 423/651 |
| 6,911,161 | B2 | * | 6/2005 | Xu et al. .................... 252/373 |
| 6,946,114 | B2 | * | 9/2005 | Allison et al. .............. 423/651 |
| 7,025,903 | B2 | * | 4/2006 | Grieve et al. ............... 252/373 |
| 7,122,170 | B2 | * | 10/2006 | Ramani et al. ............. 423/650 |
| 2002/0002794 | A1 | | 1/2002 | Figueroa et al. |
| 2002/0012624 | A1 | | 1/2002 | Figueroa et al. |
| 2002/0035036 | A1 | | 3/2002 | Figueroa et al. |
| 2002/0115730 | A1 | | 8/2002 | Allison et al. |
| 2002/0172642 | A1 | | 11/2002 | Dindi et al. |
| 2002/0177628 | A1 | | 11/2002 | Gaffney et al. |
| 2003/0032554 | A1 | | 2/2003 | Park et al. ................... 502/302 |
| 2003/0180215 | A1 | | 9/2003 | Niu et al. |

FOREIGN PATENT DOCUMENTS

| | | |
|---|---|---|
| GB | 2 240 284 A | 7/1991 |
| GB | 2 274 284 A | 7/1994 |
| WO | WO 00/00426 | 6/2000 |
| WO | WO 01/51414 | 7/2001 |
| WO | WO 01/96234 | 12/2001 |
| WO | WO 03/078309 | 9/2003 |

OTHER PUBLICATIONS

Amato et al., *Sintering of Pelleted Catalysts for Automotive Emission Control*, pp. 187-197, no date.

Arai et al., Recent Progress in High-Temperature Catalytic Combustion, Catalysis Today, 10 (1991) pp. 81-94, no month.

Arai et al., Thermal Stabilization of Catalyst Supports and their Application to High-Temperature Catalytic Combustion, Applied Catalysis A: General 138 (1996) pp. 161-176, no month.

Artizzu-Duart et al, Catalytic Combustion of Methane on Substituted Banium Hexaaluminates, Catalysis Today 59 (2000) pp. 163-177, no month.

Beguin et al., Stabilization of Alumina by Addition of Lanthanum, Applied Catalysis 75 (1991) pp. 119-132, no month.

Bish et al., Quantitative Phase Analysis Using the Rietveld Method, J. Appl. Cryst. (1998) 21, pp. 86-91, no month.

Cai et al., Atomic Scale Mechanism of the Transformation of y-Alumina to O-Alumina, Physical Review Letters, vol. 89, No. 23, (Dec. 2, 2002) pp. 235501-1-235501-4, no month.

Chen et al., High Temperature Thermal Stabilization of Alumina Modified by Lanthanum Species, Applied Catalysis A: General 205 (2001) pp. 159-172, no month.

Dexpert-Ghys, Optical and Structural Investigation of the Lanthanum β-Alumina Phase Doped with Europium, Journal of Solid State Chemistry 19, (1976) pp. 193-204, no month.

Farrington et al., The Lanthanide β" Alumina, Applied Physics A 32 (1983) pp. 159-161, no month.

Groppi et al., Preparation and Characterization of Hexaaluminate-Based Materials for Catalytic Combustion, Applied Catalysis A: General, 104 (1993) pp. 101-108, no month.

Jang et al., Catalytic Oxidation of Methane Over Hexaaluminates and Hexaaluminate-Supported Pd Catalysts, Catalysis Today 47 (1999) pp. 103-113, no month.

Johansson et al., Development of Hexaaluminate Catalysts for Combustion of Gasified Biomass in Gas Turbines, Journal of Engineering for Gas Turbines and Power, vol. 124 (Apr. 2002) pp. 235-238, no month.

Kato et al., Preparation of Lanthanum β-Alumina with High Surface Area by Coprecipitation, Journal of the American Ceramic Society, 70 [7] (Jul. 1987) pp. C-157-159.

Levy et al., The Effect of Foreign Ions on the Stability of Activated Alumina, Journal of Catalysis 9 (1967) pp. 76-86, no month.

Liu et al., Partial Oxidation of Methane over Nickel Catalysts Supported on Various Aluminas, Korean Journal of Chemical Engineering 19 (5) pp. 735-741 (2002), no month.

Liu et al., Partial Oxidation of Methane over Ni/Ce-$ZrO_3$/0-$Al_2O_3$, Korean Journal of Chemical Engineering 19 (5) pp. 742-748 (2002), no month.

Machida et al., Effect of Additives on the Surface Area of Oxide Supports for Catalytic Combustion, Journal of Catalysts 103 (1987) pp. 385-393, no month.

Machida et al., Analytical Electron Microscope Analysis of the Formation of BaO—6$Al_2O_3$, Journal of American Ceramic Society 71[12] pp. 1142-1147 (1988), no month.

Machida et al., Effect of Structural Modification on the Catalytic Property of Mn-Substituted Hexaaluminates, Journal of Catalysis 123 (1990) pp. 477-785, no month.

Matsuda et al., *8th International Congress on Catalysis Volume IV*: Impact of Surface Science on Catalysis Structure-Selectivity/Activity Correlations New Routes for Catalyst Synthesis (pp. IV-879-889), no month.

Miao et al., Partial Oxidation of Methane to Syngas over Nickel-Based Catalysts Modified by Alkali Metal Oxide and Rare Earth Metal Oxide, Applied Catalysts A: General 154 (1997) pp. 17-27, no month.

Nair et al., Pore Structure Evolution of Lanthana-Alumina Systems Prepared through Coprecipitation, Journal of American Ceramic Society 83[8] (2000) pp. 1942-1946, no month.

Oudet et al., Thermal Stabilization of Transition Alumina by Structural Coherence with $LnAlO_3$(Ln=La, Pr, Nd), Journal of Catalysis 114, (1998) pp. 112-120, no month.

Rahkeev et al., Transition Metal Atoms on Different Alumina Phases: The Role of Subsurfaces Sites on Catalytic Activity, Physical Review B 67, 115414 (2003) p. 4, no month.

Rietveld, A Profile Refinement Method for Nuclear and Magnetic Structures, Journal of Appl. Cryst. (1969) 2, pp. 65-71, no month.

Roh et al., Partial Oxidation of Methane over Ni/0-$Al_2O_3$ Catalysts, Chemistry Letters 2001 (pp. 666-667), no month.

Santos et al., Standard Transition Aluminas, Electron Microscopy Studies, Materials Research, vol. 3 No. 4 (2000) pp. 104-114, no month.

Schaper et al., The Influence of Lanthanum Oxide on the Thermal Stability of Gamma Alumina Catalyst Supports, Applied Catalysis 7 (1983) pp. 211-220, no month.

Schaper et al., Thermal Stabilization of High Surface Area Alumina, Solid State Ionics 16 (1985) pp. 261-266, no month.

Seo et al., Experimental and Numerial Studies on Combustion Characteristics of a Catalytically Stabilized Combustor, Catalysis Today 59 (2000) pp. 75-86, no month.

Russell et al., Thermal Transformations of Aluminas and Alumina Hydrates, Industrial and Engineering Chemistry vol. 42, No. 7 (1950) pp. 1398-1403, no month.

Subramanian et al., Characterization of Lanthana/Alumina Composite Oxides, Journal of Molecular Catalysts, 69 (1991) pp. 235-245, no month.

Taylor, Computer Programs for Standardless Quantitative Analysis of Minerals Using the Full Powder Diffraction Profile, Powder Diffraction, vol. 6, No. 1 (1991) pp. 2-9, no month.

Tietz et al., Investigations on Lanthanide-ion-exchanged β and β"-Alumina, Journal of Alloys and Compounds, 192 (1993) pp. 78-80, no month.

Tijburg et al., Application of Lanthanum to Psuedo-Boehmite and y-Al$_2$O$_3$,, Chapman and Hall (1991) pp. 6479-6486, no month.

Weng et al., Mechanistic Study of Partial Oxidation of Methane to Syngas Using In Situ Time-Resolved FTIR and Microprobe Raman Spectroscopies, The Chemical Record vol. 2, pp. 102-113 (2002), no month.

Wu et al., Coupled Thermodynamic-Phase Diagram Assessment of the Rare Earth Oxide-Aluminium Oxide Binary Systems, Journal of Alloys and Compounds, 179 (1992) pp. 259-287, no month.

Zhou et al., Structures and Transformation Mechanism of the n, y and 0 Transition Aluminas, International Union of Crystallography (1991) pp. 617-630, no month.

Search Report for Appln. No. PCT/US03/36008, dated Dec. 5, 2004; (2 p.).

Yamabe-Mitarai et al., Rh-Base Refractory Superalloys For Ultra-High Temperature Use, Scripta Materialia, vol. 36, No. 4, (1997) pp. 393-398, no month.

Yamabe-Mitarai et al., Development of Ir-Base Refractory Superalloys, Scripta Materialia, vol. 35, No. 2, (1996) pp. 211-215, no month.

Yamabe-Mitarai et al., Ir-Base Refractory Superalloys For Ultra-High Temperatures, Metallurgical And Material Transactions, vol. 29A (Feb. 1998) pp. 537-549.

C.S. Brooks et al. 'Synthesis of highly dispersed supported metal catalysts via chemical dissolution and precipitation of eutectic alloys' Surf. Technology vol. 11, Issue 5, pp. 333-347 (1980), no month.

\* cited by examiner

SYNGAS CATALYSTS AND THEIR METHOD OF USE

CROSS-REFERENCE TO RELATED APPLICATIONS

The present application claims the benefit of 35 U.S.C. 111(b) U.S. Provisional Application Ser. No. 60/425,381 filed Nov. 11, 2002, entitled "Novel Syngas Catalysts and Their Method of Use" and U.S. Provisional Application Ser. No. 60/425,383 filed Nov. 11, 2002, which are hereby incorporated by reference herein for all purposes. This application is related to the concurrently filed, commonly owned, co-pending U.S. Provisional Application Ser. No. 60/501,185 filed Sep. 8, 2003, entitled "Stabilized Alumina Supports, Catalysts Made Therefrom, And Their Use in Partial Oxidation."

STATEMENT REGARDING FEDERALLY SPONSORED RESEARCH OR DEVELOPMENT

Not applicable.

FIELD OF THE INVENTION

The present invention generally relates to catalysts and processes for the catalytic conversion of hydrocarbons (e.g., natural gas)

BACKGROUND OF THE INVENTION

Catalysis is the basis for many industrial/commercial processes in the world today. The most important aspect of a catalyst is that it can increase the productivity, efficiency and profitability of the overall process by enhancing the speed, activity and/or selectivity of a given reaction. Many industrial/commercial processes involve reactions that are simply too slow and/or efficient to be economical without a catalyst present. For example, the process of converting natural gas or methane to liquid hydrocarbons (an extremely desirable process) necessarily involves several catalytic reactions.

The conversion of methane to hydrocarbons is typically carried out in two steps. In the first step, methane is catalytically reformed with water to produce carbon monoxide and hydrogen (i.e., "synthesis gas" or "syngas"). In a second step, the syngas intermediate is catalytically converted to higher hydrocarbon products by processes such as the Fischer-Tropsch Synthesis. For example, fuels with boiling points in the middle distillate range, such as kerosene and diesel fuel, and hydrocarbon waxes may be produced from the synthesis gas. reforming. Steam reforming currently is the major process used commercially for the conversion of methane to synthesis gas, the reaction proceeding according to Equation 1.

$$CH_4 + H_2O \leftrightarrow CO + 3H_2 \tag{1}$$

The catalytic partial oxidation ("CPOX") of hydrocarbons, e.g., methane or natural gas, to syngas has also been described in the literature. In catalytic partial oxidation, natural gas is mixed with air, oxygen-enriched air, or oxygen, and introduced to a catalyst at elevated temperature and pressure. The partial or direct oxidation of methane yields a syngas mixture with a more preferable $H_2$:CO ratio of 2:1, as shown in Equation 2:

$$CH_4 + \tfrac{1}{2}O_2 \leftrightarrow CO + 2H_2 \tag{2}$$

The $H_2$:CO ratio for this reaction is more useful for the downstream conversion of syngas to chemicals such as methanol or other fuels than is the $H_2$:CO ratio from steam reforming. However, both reactions continue to be the focus of research in the world today.

For successful operation at commercial scale, the catalytic partial oxidation process must be able to achieve a high conversion of the methane feedstock at high gas hourly space velocities, and a high selectivity for carbon monoxide and hydrogen. In addition, the catalyst compositions should be stable under the severe reaction conditions of the syngas reaction.

Hence, there is still a great need to identify new partial oxidation catalysts, particularly partial oxidation catalysts that are able to maintain high methane conversion values as well as high carbon monoxide and hydrogen selectivity values while still resisting deactivation phenomena during the extreme syngas operating conditions.

SUMMARY OF THE INVENTION

The present invention is directed towards improved catalyst compositions, as well as methods of making and using such compositions. In particular, preferred embodiments of the present invention comprise syngas catalysts comprising high melting point alloys and methods of preparing and using the high melting point alloy catalysts. Such alloys may include one, two, three or more alloying materials where the alloy or mixed materials has a higher melt temperature than at least one of the alloying materials alone.

Accordingly, the present invention also encompasses an improved method for converting a hydrocarbon-containing gas and an atomic oxygen-containing gas to a gas mixture comprising hydrogen and carbon monoxide, i.e., syngas, using the high melting point catalysts in accordance with the present invention. The atomic oxygen-containing gas is defined as a gas, which includes at least one component with one oxygen atom. The atomic oxygen-containing gas could comprise diatomic oxygen, water (or steam), carbon dioxide, or combinations therefore. Preferably the atomic oxygen-containing gas comprises diatomic oxygen ($O_2$). The atomic oxygen-containing gas may also comprise hydrogen ($H_2$) and/or carbon monoxide (CO). The hydrocarbon-containing gas preferably comprises methane or natural gas.

In addition, the present invention contemplates an improved method for converting hydrocarbon gas to higher molecular weight hydrocarbons (i.e., $C_{5+}$ hydrocarbons) using the novel syngas catalyst compositions described herein.

One of the preferred embodiments of the present invention is a novel syngas catalyst that comprises a rhodium alloy. The preferred reactions are partial oxidation, steam reforming, and dry reforming of gaseous hydrocarbons especially of methane or natural gas, but the catalyst is equally useful in oxidative dehydrogenation reactions of gaseous hydrocarbons. The preferred rhodium alloys should increase the melting point of the rhodium catalyst material to a temperature above 1964° C. Suitable metals for the rhodium alloy include but are not limited to ruthenium, iridium, platinum, rhenium, tungsten, niobium, tantalum and zirconium, preferably ruthenium and/or iridium. When the rhodium alloy is supported, the support material comprises primarily a refractory support material, such as but not limited to modified alumina, partially-stabilized alumina, unmodified alumina, titania, modified zirconia, partially-stabilized zirconia, unmodified zirconia, and any combinations thereof, preferably modified alumina, zirconia, and combination thereof. A more preferred embodiment of the syngas catalyst is a rhodium alloy supported on a high surface area modified alumina support where the high surface area alumina has been treated with a modifying agent and heat treated. Suitable modifying agents include any one or more metals including aluminum, rare earth metals, alkali earth metals and transitions metals.

Another embodiment of the present invention comprises methods of using the high melting point catalyst compositions described above to produce a synthesis gas. The process comprises passing a hydrocarbon containing gas and an atomic oxygen-containing gas over a syngas catalyst containing high melting point alloy described above under conditions effective to produce a gas stream comprising hydrogen and carbon monoxide. A more preferred embodiment of the process for producing syngas includes a syngas catalyst made of a rhodium alloy supported on a high surface area modified alumina support where the high surface area alumina has been treated with a modifying agent and heat treated. Suitable modifying agents include any one or more metals including aluminum, rare earth metals, alkali earth metals and transitions metals. This syngas catalyst made of a rhodium alloy supported on a high surface area modified alumina support is especially useful for the partial oxidation of gaseous hydrocarbons with diatomic oxygen to syngas.

The present invention also comprises a hydrocarbon gas to liquid conversion process. At least a portion of the synthesis gas stream produced as described above is reacted with a synthesis catalyst in a synthesis reactor, e.g., Fischer-Tropsch, methanol, or the like, under conditions effective to produce liquid hydrocarbons and/or chemicals. In a preferred embodiment, the gas to liquid conversion process is carried out as a Fischer-Tropsch reaction in a Fischer-Tropsch reactor. A more preferred embodiment of the process for hydrocarbon gas to liquid conversion process includes a syngas catalyst made of a rhodium alloy. The syngas catalyst comprising a rhodium alloy is preferably supported on a high surface area modified alumina support where the high surface area alumina has been treated with a modifying agent and heat treated. Suitable modifying agents include any one or more metals including aluminum, rare earth metals, alkali earth metals and transitions metals. According to one preferred embodiment of the present invention, partial oxidation over said syngas catalyst is assumed for at least part of the syngas production reaction.

These and other embodiments, features and advantages of the present invention will become apparent with reference to the following detailed description and drawings.

BRIEF DESCRIPTION OF THE DRAWINGS

For a more detailed understanding of the preferred embodiments, reference is made to the accompanying drawings, wherein.

DETAILED DESCRIPTION OF THE PREFERRED EMBODIMENTS

Figure 1:
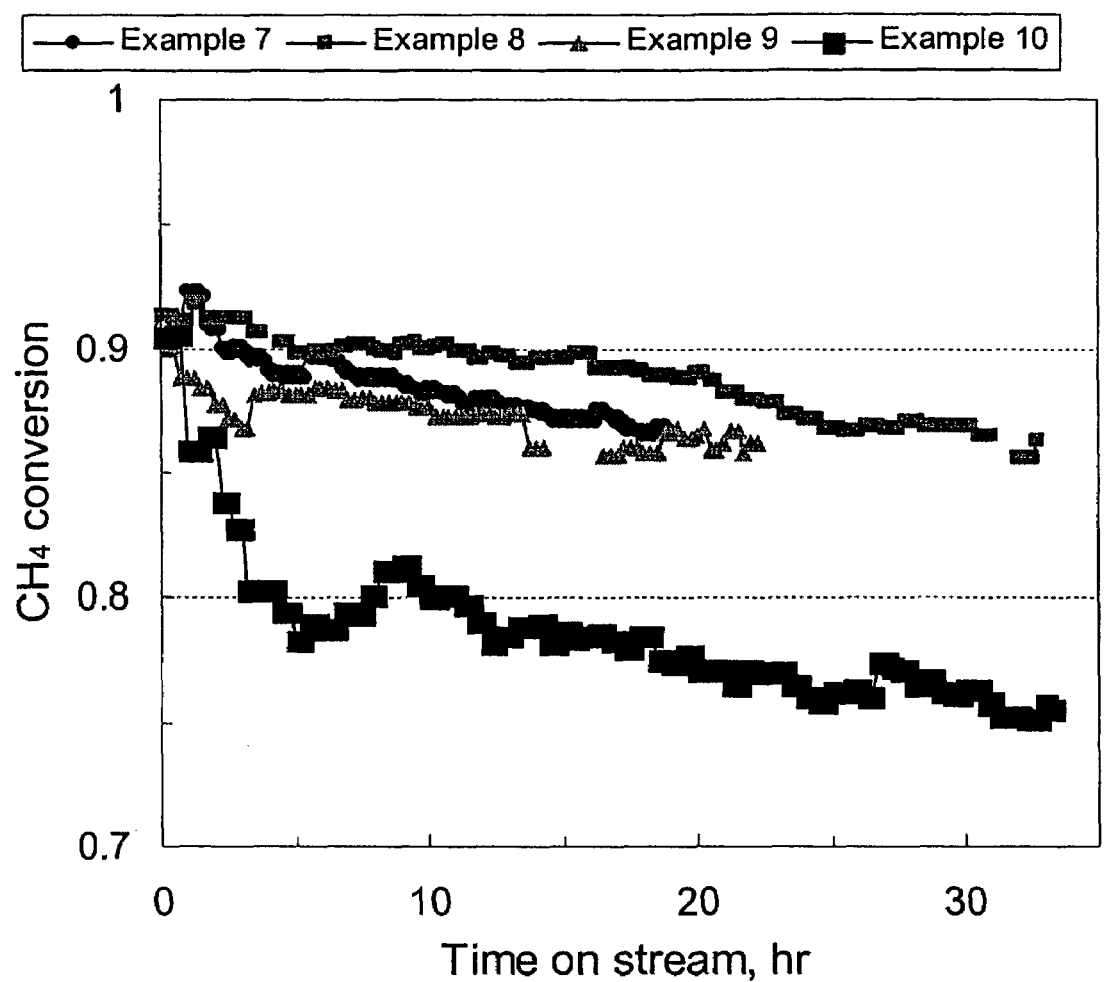
FIG. 1 is graph showing the methane conversion for several example catalysts.

Herein will be described in detail, specific embodiments of the present invention, with the understanding that the present disclosure is to be considered an exemplification of the principles of the invention, and is not intended to limit the invention to that illustrated and described herein. The present invention is susceptible to embodiments of different forms or order and should not be interpreted to be limited to the specifically expressed methods or compositions contained herein. In particular, various embodiments of the present invention provide a number of different configurations of the overall gas to liquid conversion process.

The present invention relates to improved catalyst compositions, as well as methods of making and using them. In particular, preferred embodiments of the present invention comprise high melting point catalysts comprising metal alloys, and methods of preparing and using the catalysts. The present invention is more preferably directed towards syngas catalysts used in syngas production from hydrocarbon gas, such as employing partial oxidation, steam reforming, dry reforming reactions, and even more preferably directed towards syngas catalysts that contain a rhodium alloy. However, it should be appreciated that the catalyst compositions according to the present invention are useful for other partial oxidation reactions, which are intended to be within the scope of the present invention. Some or all of the syngas can be used as a feedstock in subsequent synthesis processes, such as Fischer-Tropsch synthesis, alcohol (particularly methanol) synthesis, hydrogen production, hydroformylation, or any other use for syngas. One preferred application for the product stream comprising CO and $H_2$ is for producing, via the Fischer-Tropsch synthesis, higher molecular weight hydrocarbons, such as $C_{5+}$ hydrocarbons (which are in liquid form under reaction conditions). Thus, the present invention contemplates an improved method for converting hydrocarbon gas to higher molecular weight hydrocarbons using the novel syngas catalyst compositions described herein.

Thus, the invention also relates to processes for converting hydrocarbon-containing gas to liquid products via an integrated syngas production to Fischer-Tropsch process, a methanol process, or other process.

According to the present invention, a syngas reactor can comprise any of the synthesis gas technology and/or methods known in the art. The hydrocarbon-containing feed is almost exclusively obtained as natural gas. However, the most important component is generally methane. Methane or other suitable hydrocarbon feedstocks (hydrocarbons with four carbons or less) are also readily available from a variety of other sources such as higher chain hydrocarbon liquids, coal, coke, hydrocarbon gases, etc., all of which are clearly known in the art. Similarly, the atomic oxygen-containing gas may come from a variety of sources and will be somewhat dependent upon the nature of the reaction being used. For example, a partial oxidation reaction requires diatomic oxygen as the atomic oxygen-containing feedstock, while steam reforming requires only steam, and dry reforming requires carbon dioxide. According to the preferred embodiment of the present invention, partial oxidation is assumed for at least part of the syngas production reaction.

Regardless of the source, the hydrocarbon-containing feed and the atomic oxygen-containing feed are reacted under catalytic conditions. Improved catalyst compositions in accordance with the present invention are described herein. They generally are comprised of a catalytic alloyed metal that has been reduced to its active form and one or more promoters on a support structure. The support structure can be in the form of a monolith or can be in the form of divided or discrete structures or particulates. The term "monolith" as used herein is any singular piece of material of continuous manufacture such as solid pieces of metal or metal oxide or foam materials or honeycomb structures. The terms "discrete" structures, as used herein, refer to supports in the form of divided materials such as granules, beads, pills, pellets, cylinders, trilobes, extrudates, spheres or other rounded shapes, or another manufactured configuration. Alternatively, the divided material may be in the form of irregularly shaped particles. Often, the shape or form selected will dictate the type of catalyst bed that must be used. For example, fixed beds are comprised of monoliths, foam and/or large particle sized supports. Small support particles tend to be more useful in fluidized beds. Preferably at least a majority (i.e., >50%) of the particles or distinct structures have a maximum characteristic length (i.e., longest dimension) of less than six millimeters, preferably less than three millimeters. According to some embodiments, the divided catalyst structures have a diameter or longest characteristic dimension of about 1/100" to 1/4" (about 0.25 mm to 6.35 mm). In other embodiments they are in the range of about 50 microns to 6 mm.

In one preferred embodiment where the syngas catalyst is employed in a partial oxidation reactor, a hydrocarbon gas feedstock and a diatomic oxygen feedstock are mixed so as to provide a feedstream to the partial oxidation reactor comprising a catalyst bed. The feedstream is preferably preheated and passed over or through the catalyst bed comprising the novel syngas catalyst described herein. As the feedstream contacts the catalyst, the catalytic partial oxidation reaction takes place. The synthesis gas product contains primarily hydrogen and carbon monoxide, however, many other minor components may be present including steam, nitrogen, carbon dioxide, ammonia, hydrogen cyanide, etc., as well as unreacted feedstock, such as methane and/or diatomic oxygen. The synthesis gas product, i.e., syngas, is then ready to be used, treated, or directed to its intended purpose. For example, in the instant case some or all of the syngas is preferably used as a feedstock in a subsequent synthesis process, such as a Fischer-Tropsch process.

The gas hourly space velocity of the feedstream in the partial oxidation reactor can vary widely. Space velocities for the syngas production process via partial oxidation, stated as gas hourly space velocity (GHSV), are in the range of about 20,000 to about 100,000,000 $hr^{-1}$, more preferably of about 100,000 to about 800,000 $hr^{-1}$, most preferably of about 400,000 to about 700,000 $hr^{-1}$. Although for ease in comparison with prior art systems space velocities at standard conditions have been used to describe the present invention, it is well recognized in the art that residence time is the inverse of space velocity and that the disclosure of high space velocities corresponds to low residence times on the catalyst. "Space velocity," as that term is customarily used in chemical process descriptions, is typically expressed as volumetric gas hourly space velocity in units of $hr^{-1}$. Under these operating conditions a flow rate of reactant gases is maintained sufficient to ensure a residence or dwell time of each portion of reactant gas mixture in contact with the catalyst of no more than 200 milliseconds, preferably less than 50 milliseconds, and still more preferably less than 20 milliseconds. A contact time less than 10 milliseconds is highly preferred. The duration or degree of contact is preferably regulated so as to produce a favorable balance between competing reactions and to produce sufficient heat to maintain the catalyst at the desired temperature. In order to obtain the desired high space velocities, the process is operated at atmospheric or superatmospheric pressures. The pressures may be in the range of about 100 kPa to about 32,000 kPa (about 1–320 atm), preferably from about 200 kPa to about 10,000 kPa (about 2–100 atm). The catalytic partial oxidation reactor is preferably operated at a temperature in the range of about 350° C. to about 2,000° C. More preferably, the temperature is maintained in the range 400° C.–2,000° C., as measured at the reactor outlet. Additional description for operating a catalytic partial oxidation reactor is disclosed in co-owned U.S. published patent application 2002-0115730 and the equivalent published PCT patent application WO 02/20395, each of which is incorporated herein by reference in its entirety.

Suitable conditions for operating a steam reforming reactor and a dry reforming reactor are disclosed in V. R. Choudhary et al., in Catalysis Letters (1995) vol. 32, pp. 387–390; S. S. Bharadwaj & L. D. Schmidt in Fuel Process. Technol. (1995), vol. 42, pp. 109–127; and Y. H. Hu & E. Ruckenstein, in Catalysis Reviews—Science and Engineering (2002), vol. 44(3), pp. 423–453, each of which is incorporated herein by reference in its entirety.

Suitable conditions for operating an oxidative dehydrogenation reactor are disclosed in co-owned U.S. published patent application 2003-0040655, which is incorporated herein by reference in its entirety.

The syngas catalyst compositions according to the present invention comprise high melting point alloys. In particular, the preferred catalysts comprise high melting point rhodium alloys on a support. It has been discovered that these high melting point rhodium alloys are more thermally stable than typical rhodium catalysts, i.e., typical mixed metal catalysts comprising rhodium, which leads to enhanced ability of the catalyst to resist various deactivation phenomena. It is well known that during syngas reactions, several undesired processes, such as coking (carbon deposition), metal migration, and sintering of metal and/or the support, can occur and severely deteriorate catalytic performance. The catalyst compositions of the present invention are better able to resist at least one of these phenomena over longer periods of time than prior art catalysts. As a consequence, these novel rhodium alloy containing catalysts can maintain high hydrocarbon conversion as well as high CO and $H_2$ selectivities over extended periods of time with little to no deactivation of the syngas catalyst.

Accordingly, one of the preferred embodiments of the present invention is a syngas catalyst that comprises a high melting point rhodium alloy. The rhodium alloy has shown surprising results over typical mixed metal rhodium catalysts. It is well known, that at temperatures between 1/3 and 1/2 of the melting temperature of the metal, supported metal particles can become mobile which leads to loss of metal surface area due to metal particle agglomeration. This invention raises the melting point of the supported metal by creating an alloy. The preferred rhodium alloys should increase the melting point of the metal catalyst material to a temperature above 1964° C. (the Rh melting temperature). It is believed that the higher melting point allows the catalytic material to be less mobile during the extreme operating conditions of a syngas reaction. Suitable metals for the rhodium alloy generally include but are not limited to Group VIII metals, as well as rhenium, tungsten, zirconium and mixtures thereof. The rhodium alloy should, however, be substantially free of nickel. The preferred metals are ruthenium, iridium, platinum, rhenium, tungsten, niobium, tantalum, zirconium and combinations thereof, most preferably ruthenium and iridium.

Restating one of the very important aspects of the invention for emphasis, high productivity of a catalyst is related to the surface area of the active catalyst metal. At the temperatures of the reaction in a catalytic partial oxidation reactor, the catalyst metal has a tendency to sinter, migrate and/or coalesce. As such, the metal surface area decreases and the productivity of the syngas process diminishes. By alloying the active catalyst metal with alloying materials that raise the melting point, the proclivity of the metal to sinter or migrate diminishes providing more stable long term productivity and catalyst life. The alloying material(s) may also be selected to resist coking. Obviously, coking diminishes catalyst life and syngas productivity by coating the catalyst metal with coke.

In accordance with the present invention, rhodium preferably comprises from about 0.1 to about 20 wt % of the catalyst material, preferably from about 1 to about 10 wt %, and more preferably from about 2 to about 8 wt %. Likewise, the other metal in the rhodium alloy preferably comprises from about 0.1 to about 20 wt % of the catalyst material, preferably from about 1 to about 10 wt %, and more preferably from about 2 to about 8 wt %.

The catalyst compositions may also contain one or more promoters. Suitable promoters are selected from the group consisting of lanthanides, alkali earth metals and mixtures thereof. Promoters preferably comprise about 10 wt %, of the catalyst composition. In addition, the catalysts of the present invention are preferably supported catalysts. The support material may be any traditional support material known and used in the art, such as but not limited to, modified alumina, partially-stabilized alumina, unmodified alumina, titania, modified zirconia, partially-stabilized zirconia, unmodified zirconia, and any combinations thereof, preferably modified alumina, zirconia, and combination thereof.

The catalysts of the present invention should maintain hydrocarbon conversion of equal to or greater than about 80%, preferably equal to or greater than about 85%, more preferably equal to or greater than about 90%, and most preferably equal to or greater than 95% after 48 hours of operation when operating at pressures of greater than 2 atmospheres. Likewise, the rhodium alloy-based catalysts should maintain CO and $H_2$ selectivities of equal to or greater than about 80%, preferably equal to or greater than about 85%, more preferably equal to or greater than about 90%, and most preferably equal to or greater than about 95% after 48 hours of operation when operating at pressures of greater than 2 atmospheres.

EXAMPLES

Preparation of Supports

The unmodified alumina support was obtained as $\gamma$-$Al_2O_3$ spheres with the following characteristics: a size in the range of 1.2 to 1.4 mm (average diameter of 1.3 mm), a bulk density of 0.44 g/ml, a surface area and pore volume measure with $N_2$ adsorption of 143 $m^2/g$ and 0.75 ml/g respectively.

Example A $La_2O_3$ Modified $Al_2O_3$

The $\gamma$-$Al_2O_3$ spheres described above were impregnated with a aqueous solution containing desired amount of $La(NO_3)_3$ so that the $La_2O_3$ amount in the final material after drying and calcinations is approximately 3% by weight. The $Al_2O_3$ spheres impregnated with $La(NO_3)_3$ solution were dried in oven at 120° C. for overnight and then calcined at 1100° C. for 3 hr. The $La_2O_3$—$Al_2O_3$ spheres were either subject to further modifications with the addition of a promoter or used directly as catalyst support.

Example B $La_2O_3$ Modified $Al_2O_3$

The same $Al_2O_3$ spheres described above were impregnated with a solution containing desired amounts of both $La(NO_3)_3$ and $Al(NO_3)_3$, and then the obtained material was dried overnight in an oven at 120° C. and calcined at 1100° C. for 3 hrs.

Table 1 lists the BET surface areas, pore volume, average pore diameter, of (commercially available) unmodified □-$Al_2O_3$ and modified $Al_2O_3$ catalyst supports Surface area and pore size distribution are obtained on a Micromeritics TriStar 3000 analyzer after degassing the sample at 190° C. in flowing nitrogen for five hours. Surface area is determined from ten points in the nitrogen adsorption isotherm between 0.05 and 0.3 relative pressure and calculating the surface area by the standard BET procedure. Pore size distribution is determined from a minimum of 30 points in the nitrogen desorption isotherm and calculated using the BJH model for cylindrical pores. The instrument control and calculations are performed using the TriStar software and are consistent with ASTM D3663-99 "Surface Area of Catalysts and Catalyst Carriers", ASTM D4222-98 "Determination of Nitrogen Adsorption and Desorption Isotherms of Catalysts by Static Volumetric Measurements", and ASTM D4641-94 "Calculation of Pore Size Distributions of Catalysts from Nitrogen Desorption Isotherms". The initial surface area of the catalyst is the surface area of the catalyst structure prior to contact of reactant gas. The pore volume of the catalyst ($N_2$ as adsorptive) is measured and calculated using the method described above. Average pore size (diameter) based on $N_2$ adsorptive is calculated as 4V/A.

TABLE 1

Surface area, pore volume and average pore diameter of support and catalyst examples after calcination of the support.

| Examples | Composition | Calcination Temp. of support, ° C. | BET SA, $m^2/g$ | Pore volume, ml/g | Avg. pore diameter, nm |
|---|---|---|---|---|---|
| A | $La_2O_3$—$Al_2O_3$ | 1100 | 89 | 0.63 | 21 |
|  |  | 1200 | 56 | 0.42 | 23 |
| B | $La_2O_3$—$Al_2O_3$* | 1100 | 87 | 0.57 | 20 |
| control | unmodified $Al_2O_3$ | 1100 | 80 | 0.54 | 21 |
|  |  | 1200 | 16 | 0.19 | 45 |

Prepared by impregnating $Al_2O_3$ with a solution containing $La(NO_3)_3$ and $Al(NO_3)_3$ Preparation of Catalysts Nine different alloy catalysts were tested. The catalysts were prepared by alloying a rhodium component with the alloy material (ruthenium, iridium, rhenium) using an incipient wetness impregnation technique. One non-alloy example with rhodium was also generated for comparison purpose.

Example 1

4% Rh-4% Ru/$La_2O_3$—$Al_2O_3$

A rhodium alloy catalyst was prepared with the following method. The $La_2O_3$-modified $Al_2O_3$ support material described as EXAMPLE A was impregnated With a solution of $RhCl_3$ and $RuCl_3$ so as to achieve 4 wt % for both Rh and Ru. After impregnation, the catalyst was dried in an oven overnight at 120° C., calcined in air at 900° C. for 3 hrs and then reduced in $H_2$ at 600° C. hrs. The Rh and Ru metal content in the catalyst was 4% by weight for each metal as calculated by mass balance after drying and calcination.

Example 2

4% Rh-4% Ru/$La_2O_3$-$Al_2O_3$

Another rhodium alloy catalyst was prepared with the method described in EXAMPLE 1 except that the $La_2O_3$ modified $Al_2O_3$ spheres from EXAMPLE B were impregnated with a solution containing both $RhCl_3$ and $RuCl_3$ such that to achieve 4 wt % for both Rh and Ru. The conditions for drying, calcination, reduction, are the same as those described in Example 1. The Rh and Ru content of the catalyst was 4 wt % for each metal weight as calculated by mass balance after drying and calcination.

Example 3

4% Rh-4% Ru/$Al_2O_3$

A rhodium-ruthenium alloy catalyst was prepared with the method described in EXAMPLE 1. The unmodified $\gamma$-$Al_2O_3$ spheres were impregnated with a solution containing both $RhCl_3$ and $RuCl_3$ such that to achieve 4 wt % for both Rh and Ru. The conditions for drying, calcination, reduction, are the same as those described in Example 1. The Rh and Ru content of the catalyst was 4 wt % for each metal weight as calculated by mass balance after drying and calcination.

Example 4

4% Rh-4% Ir/MgO—$Al_2O_3$

A rhodium-iridium alloy catalyst was prepared with the method described in EXAMPLE 1. An MgO modified $Al_2O_3$ catalyst support (obtained from Condea) was impregnated with a solution containing both $RhCl_3$ and $IrCl_4$ such that to achieve 4 wt % for both Rh and Ir. The conditions for drying, calcination, reduction, are the same as those described in Example 1. The Rh and Ir content of the catalyst was 4 wt % for each metal weight as calculated by mass balance after drying and calcination.

Example 5

4% Rh-4% Ru/MgO—$Al_2O_3$

A rhodium-ruthenium alloy catalyst was prepared with the method described in EXAMPLE 1. An MgO modified $Al_2O_3$ catalyst support (obtained from Condea) was impregnated with a solution containing both $RhCl_3$ and $RuCl_3$ such that to achieve 4 wt % for both Rh and Ru. The conditions for drying, calcination, reduction, are the same as those described in Example 1. The Rh and Ru content of the catalyst was 4 wt % for each metal weight as calculated by mass balance after drying and calcination.

Example 6

4% Rh-4% Ru/$La_2O_3$-$Al_2O_3$

A rhodium-ruthenium alloy catalyst was prepared with the method described in EXAMPLE 1. A $La_2O_3$ modified $Al_2O_3$ catalyst support (obtained from Condea) was impregnated with a solution containing both $RhCl_3$ and $RuCl_3$ such that to achieve 4 wt % for both Rh and Ru. The conditions for drying, calcination, reduction, are the same as those described in Example 1. The Rh and Ru content of the catalyst was 4 wt % for each metal weight as calculated by mass balance after drying and calcination.

Example 7

2% Rh-2% Ir/MgO-$Al_2O_3$

A rhodium-iridium alloy catalyst was prepared with the method described in EXAMPLE 1. A MgO modified $Al_2O_3$ catalyst support (obtained from Condea) was impregnated with a solution containing both $RhCl_3$ and $IrCl4$ such that to achieve 2 wt % for both Rh and Ir. The conditions for drying, calcination, reduction, are the same as those described in Example 1. The Rh and Ir content of the catalyst was 2 wt % for each metal weight as calculated by mass balance after drying and calcination.

Example 8

2% Rh-2% Re/MgO—$Al_2O_3$

A rhodium-rhenium alloy catalyst was prepared with the method described in EXAMPLE 1. A MgO modified $Al_2O_3$ catalyst support (obtained from Condea) was impregnated with a solution containing both rhodium chloride and rhenium chloride such that to achieve 2 wt % for both Rh and Re. The conditions for drying, calcination, reduction, are the same as those described in Example 1. The Rh and Re content of the catalyst was 2 wt % for each metal weight as calculated by mass balance after drying and calcination.

Example 9

2% Rh-2% Ru/MgO—$Al_2O_3$

A rhodium-ruthenium alloy catalyst was prepared with the method described in EXAMPLE 1. A MgO modified $Al_2O_3$ catalyst support (obtained from Condea) was impregnated with a solution containing both $RhCl_3$ and $RuCl_3$ such that to achieve 4 wt % for both Rh and Ru. The conditions for drying, calcination, reduction, are the same as those described in Example 1. The Rh and Ru content of the catalyst was 2 wt % for each metal weight as calculated by mass balance after drying and calcination.

Example 10

(Non-alloy): 2% Rh/MgO—$Al_2O_3$

A rhodium catalyst was prepared with the method described in EXAMPLE 1 except that only one metal was deposited on the support. A MgO modified $Al_2O_3$ catalyst support (obtained from Condea) was impregnated with a solution containing $RhCl_3$ such that to achieve 2 wt % for both Rh. The conditions for drying, calcination, reduction, are the same as those described in Example 1. The Rh content of the catalyst was 2 wt % metal weight as calculated by mass balance after drying and calcination.

Catalyst compositions, metal surface area per gram of catalyst, and metal dispersion for Examples 1–6 are summarized in the Table 2 below.

TABLE 2

Catalyst Compositions on different supports, metal surface area, and metal (rhodium) dispersion.

| Catalyst Examples | Alloy metal loading, wt % | Support | Metal Surface Area, -m²/g catalyst structure | Metal dispersion - rhodium, % |
|---|---|---|---|---|
| 1 | 4% Rh/4% Ru | $La_2O_3$—$Al_2O_3$ | 1.30 | 3.7 |
| 2 | 4% Rh/4% Ru | $La_2O_3$—$Al_2O_3$ | 1.33 | 3.8 |
| 3 | 4% Rh/4% Ru | *$Al_2O_3$ | 0.62 | 1.76 |
| 4 | 4% Rh/4% Ir | *MgO—$Al_2O_3$ | 2.8 | 7.8 |
| 5 | 4% Rh/4% Ru | *MgO—$Al_2O_3$ | 5.7 | 16.2 |
| 6 | 4% Rh/4% Ru | *$La_2O_3$—$Al_2O_3$ | 4.1 | 11.6 |

*commercially available

The metal surface area of the catalyst is determined by measuring the dissociative chemical adsorption of $H_2$ on the surface of the metal. A Micromeritics ASAP 2010 automatic analyzer system is used, employing $H_2$ as a probe molecule. The ASAP 2010 system uses a flowing gas technique for sample preparation to ensure complete reduction of reducible oxides on the surface of the sample. A gas such as hydrogen flows through the heated sample bed, reducing the oxides on the sample (such as platinum oxide) to the active metal (pure platinum). Since only the active metal phase responds to the chemisorbate (hydrogen in the present case), it is possible to measure the active surface area and metal dispersion independently of the substrate or inactive components. The analyzer uses the static volumetric technique to attain precise dosing of the chemisorbate and rigorously equilibrates the sample. The first analysis measures both strong and weak sorption data in combination. A repeat analysis measures only the weak (reversible) uptake of the probe molecule by the sample supports and the active metal. As many as 1000 data points can be collected with each point being fully equilibrated. Prior to the measurement of the metal surface area the sample is pre-treated. The first step is to pretreat the sample in He for 1 hr at 100° C. The sample is then heated to 350° C. in He for 1 hr. These steps clean the surface prior to measurement. Next the sample is evacuated to sub-atmospheric pressure to remove all previously adsorbed or chemisorbed species. The sample is then oxidized in a 10% oxygen/helium gas at 350° C. for 30 minutes to remove any possible organics that are on the surface. The sample is then reduced at 400° C. for 3 hours in pure hydrogen gas. This reduces any reducible metal oxide to the active metal phase. The sample is then evacuated using a vacuum pump at 400° C. for 2 hours. The sample is then cooled to 35° C. prior to the measurement. The sample is then ready for measurement of the metal surface. From the measurement of the volume of $H_2$ uptake during the measurement step, it is possible to determine the metal surface area per gram of catalyst structure by the following equation.

$$MSA = (V)(A)(S)(a)/22400/m$$

where MSA is the metal surface are in m2/gram of catalyst structure;

V is the volume of adsorbed gas at Standard Temperature and Pressure in ml.;

A is the Avogadro constant;

S is the stoichiometric factor (2 for $H_2$ chemisorption on rhodium);

m is the sample weight in grams; and a is the metal cross sectional area.

As shown in Table 2, the alloy catalysts have a high metal surface area from 0.8 to 5.7 meter squares per gram of catalyst structure and a metal (rhodium) dispersion between 3.7 and 16.2. Example 5 has the highest metal surface area and metal dispersion, whereas Example 3 has the lowest metal surface area and metal dispersion out of the 6 examples listed in Table 2. The metal surface area and metal dispersion is primarily affected by the selection of the material used to support the alloy as can be seen with the same alloy composition 4% Rh-4% Ru in Examples 1, 2, 3, 5, 6.

The metal surface area per gram of metal were also measured for Examples 1, 2, and 3 were respectively 16.3, 16.7, and 7.7 m²/g metal.

Fixed Bed Reactivity Testing

These catalyst Examples 1, 4, and 5 were tested with molecular oxygen and natural gas as the hydrocarbon feed with a typical composition of about 93.1% methane, 3.7% ethane, 1.34% propane, 0.25% butane, 0.007% pentane, 0.01% $C_{5+}$, 0.31% carbon dioxide, 1.26% nitrogen (with % meaning volume percent). The hydrocarbon feed was preheated at 300° C. and then mixed with $O_2$. The reactants were fed into a fixed bed reactor at a carbon to $O_2$ molar ratio of 1.87 or an $O_2$:natural gas mass ratio of 1.05 at gas hourly space velocities (GHSV) of about 440,000 or about 635,060 hr−1. The gas hourly space velocity is defined by the volume of reactant feed per volume of catalyst per hour. The partial oxidation reaction was carried out in a conventional flow apparatus using a 12.7 mm I.D. quartz insert embedded inside a refractory-lined steel vessel. The quartz insert contained a catalyst bed (comprising of 2.0 g of catalyst particles) held between two inert 80-ppi alumina foams. The reaction took place for several days at a pressure of about 45 psig (412 kPa) or about 90 psig (722 kPa) and at temperatures at the exit of reactor between about 800° C. and about 1200° C. All the flows were controlled by mass flow controllers. The reactor effluent as well as feedstock was analyzed using a gas chromatograph equipped with a thermal conductivity detector. Pressures at the inlet and outlet on the reactor were measured by a differential pressure transmitter which gives the overall pressure drop across the catalytic bed by subtracting the pressure at the outlet from the pressure at the inlet.

The data analyzed include catalyst performance as determined by conversion and selectivity, and deactivation rate measured for some over the length of each run. The catalyst performances (CO conversion, $H_2$ and CO selectivity) over time are listed in the following Tables 3–6 for Examples 1, 4, 5, and 6 respectively.

Table 3 shows that the initial performance as a function of time on stream, of the RhRu catalyst in Example 1. The initial performance, i.e., after 6 hours at 90 psig, values were 96.1% CO selectivity, 95.8% $H_2$ selectivity and 93.8% methane conversion.

TABLE 3

Test data with $CH_4$ conversion, CO and $H_2$ selectivity as a function of time on stream for Example 1 (RhRu) at 90 psig and about 438,000 $hr^{-1}$ GHSV.

| Time, hr | P, psig | $CH_4$ conversion | CO Selectivity | $H_2$ Selectivity |
|---|---|---|---|---|
| 2 | 90 | 94.0% | 96.0% | 95.8% |
| 6 | 90 | 93.8% | 96.1% | 95.8% |
| 10 | 90 | 93.3% | 95.9% | 95.2% |
| 14 | 90 | 92.4% | 95.7% | 95.0% |
| 18 | 90 | 91.9% | 95.4% | 94.3% |
| 22 | 90 | 91.1% | 95.1% | 93.5% |
| 26 | 90 | 91.6% | 95.2% | 93.7% |
| 30 | 90 | 92.1% | 95.2% | 93.5% |
| 34 | 90 | 91.3% | 95.2% | 93.5% |
| 38 | 90 | 90.7% | 95.0% | 93.4% |
| 42 | 90 | 90.7% | 95.0% | 92.9% |
| 46 | 90 | 90.6% | 94.9% | 92.9% |
| 50 | 90 | 90.2% | 94.8% | 92.6% |
| 54 | 90 | 90.2% | 94.8% | 92.7% |
| 58 | 90 | 90.2% | 94.8% | 92.6% |
| 62 | 90 | 89.8% | 94.7% | 92.2% |
| 66 | 90 | 90.1% | 94.6% | 91.9% |
| 70 | 90 | 89.6% | 94.6% | 91.9% |
| 74 | 90 | 89.8% | 94.5% | 91.7% |
| 78 | 90 | 89.2% | 94.4% | 91.3% |
| 82 | 90 | 88.9% | 94.2% | 90.9% |
| 86 | 90 | 88.7% | 94.1% | 90.6% |
| 90 | 90 | 88.2% | 94.1% | 90.3% |
| 94 | 90 | 88.0% | 94.0% | 90.5% |
| 98 | 90 | 87.5% | 93.8% | 90.0% |
| 100 | 90 | 87.6% | 93.8% | 89.9% |

Table 4 shows that the initial performance after 3 hours at 90 psig, of the RhIr catalyst in Example 4 was not as good as the RhRu alloys in Examples 1 and 5, but still a workable catalyst composition. The initial performance values were 90.2% CO selectivity, 83.2% $H_2$ selectivity and 80.0% methane conversion. More importantly, after 48 hours on stream the catalyst performance did not show signs of deactivation but instead showed signs of improvement to values of 90.5% CO selectivity, 83.3% $H_2$ selectivity and 81.1% methane conversion.

TABLE 4

Test data with $CH_4$ conversion, CO and $H_2$ selectivity as a function of time on stream for Example 4 (RhIr) at 90 psig and about 635,000 $hr^{-1}$ GHSV.

| Time, hr | P, psig | $CH_4$ conversion | CO Selectivity | $H_2$ Selectivity |
|---|---|---|---|---|
| 3 | 90 | 80.0% | 90.2% | 83.2% |
| 6 | 90 | 80.6% | 90.2% | 82.6% |
| 9 | 90 | 79.7% | 89.9% | 82.7% |
| 12 | 90 | 79.5% | 90.4% | 84.0% |
| 15 | 90 | 80.1% | 90.4% | 84.0% |
| 18 | 90 | 79.8% | 90.5% | 83.9% |
| 21 | 90 | 80.1% | 90.6% | 84.2% |
| 24 | 90 | 80.7% | 90.8% | 84.1% |
| 27 | 90 | 81.6% | 90.6% | 84.0% |
| 30 | 90 | 80.9% | 90.8% | 84.6% |
| 33 | 90 | 81.6% | 90.8% | 84.0% |
| 36 | 90 | 81.6% | 90.8% | 83.9% |
| 39 | 90 | 80.1% | 90.6% | 84.6% |
| 42 | 90 | 80.1% | 90.2% | 84.6% |
| 45 | 90 | 80.3% | 90.8% | 84.6% |
| 48 | 90 | 81.1% | 90.5% | 83.3% |

Table 5 shows that the initial performance, i.e., after 2 hours at 45 psig, of the RhRu catalyst in Example 5 indicated an excellent catalyst having performance values of 95.2% CO selectivity, 95.3% $H_2$ selectivity and 85.6% methane conversion. After 92 hours on stream, the values had not significantly changed and, in fact, the methane conversion value increased to 86.2%.

Table 6 shows that the initial performance, i.e., after 2 hours at 45 psig, of the RhRu catalyst in Example 6 indicated an excellent catalyst having performance values of 95.7% CO selectivity, 93.7% $H_2$ selectivity and 88.4% methane conversion. The catalyst performance was stable after 75 hrs at 45 psig, but some decay in performance was observed after the reaction pressure was increased to 90 psig.

TABLE 5

Test data with $CH_4$ conversion, CO and $H_2$ selectivity as a function of time on stream for Example 5 (RhRu) at 45 psig and about 440,000 hr-1 GHSV.

| Time, hr | P, psig | $CH_4$ conversion | CO Selectivity | $H_2$ Selectivity |
|---|---|---|---|---|
| 2 | 45 | 85.6% | 95.2% | 95.3% |
| 6 | 45 | 85.7% | 95.1% | 95.3% |
| 10 | 45 | 85.6% | 95.1% | 95.5% |
| 14 | 45 | 85.6% | 95.1% | 95.3% |
| 18 | 45 | 85.2% | 95.1% | 95.0% |
| 22 | 45 | 85.0% | 95.1% | 95.2% |
| 26 | 45 | 85.5% | 95.0% | 94.9% |
| 32 | 45 | 85.1% | 95.1% | 95.2% |
| 38 | 45 | 85.9% | 95.1% | 95.2% |
| 44 | 45 | 85.7% | 95.1% | 95.0% |
| 50 | 45 | 86.3% | 95.1% | 94.7% |
| 58 | 45 | 85.1% | 95.1% | 95.2% |
| 66 | 45 | 85.9% | 95.1% | 94.9% |
| 74 | 45 | 86.9% | 95.3% | 95.2% |
| 82 | 45 | 86.2% | 95.2% | 95.3% |
| 92 | 45 | 86.2% | 95.1% | 95.1% |

TABLE 6

Test data with $CH_4$ conversion, CO and $H_2$ selectivity as a function of time on stream for Example 6 (RhRu) at 45 and 90 psig and about 440,000 hr-1 GHSV.

| Time, hr | P, psig | $CH_4$ conversion | CO Selectivity | $H_2$ Selectivity |
|---|---|---|---|---|
| 2 | 45 | 88.4% | 95.7% | 93.7% |
| 12 | 45 | 88.4% | 95.8% | 94.0% |
| 18 | 45 | 88.5% | 95.8% | 94.0% |
| 24 | 45 | 88.5% | 95.7% | 93.8% |
| 36 | 45 | 87.6% | 95.7% | 94.0% |
| 45 | 45 | 87.7% | 95.6% | 93.3% |
| 48 | 45 | 86.2% | 95.6% | 93.4% |
| 54 | 45 | 89.5% | 95.6% | 93.0% |
| 66 | 45 | 88.5% | 95.7% | 93.1% |
| 75 | 47 | 85.4% | 95.9% | 93.9% |
| 81 | 90 | 87.4% | 94.7% | 90.5% |
| 90 | 90 | 88.3% | 94.3% | 89.2% |
| 102 | 90 | 88.4% | 94.3% | 88.7% |
| 114 | 90 | 87.8% | 94.0% | 87.8% |
| 126 | 90 | 84.6% | 93.8% | 87.3% |
| 138 | 90 | 83.4% | 93.6% | 87.0% |
| 150 | 90 | 83.9% | 93.4% | 86.0% |
| 162 | 90 | 83.4% | 93.2% | 85.7% |
| 174 | 90 | 83.9% | 92.9% | 88.7% |
| 186 | 90 | 78.9% | 93.0% | 86.9% |
| 198 | 90 | 82.5% | 92.7% | 84.8% |
| 210 | 90 | 83.5% | 92.8% | 84.3% |
| 222 | 90 | 83.0% | 92.6% | 83.9% |
| 225 | 90 | 83.5% | 92.6% | 84.0% |

Figure 2:
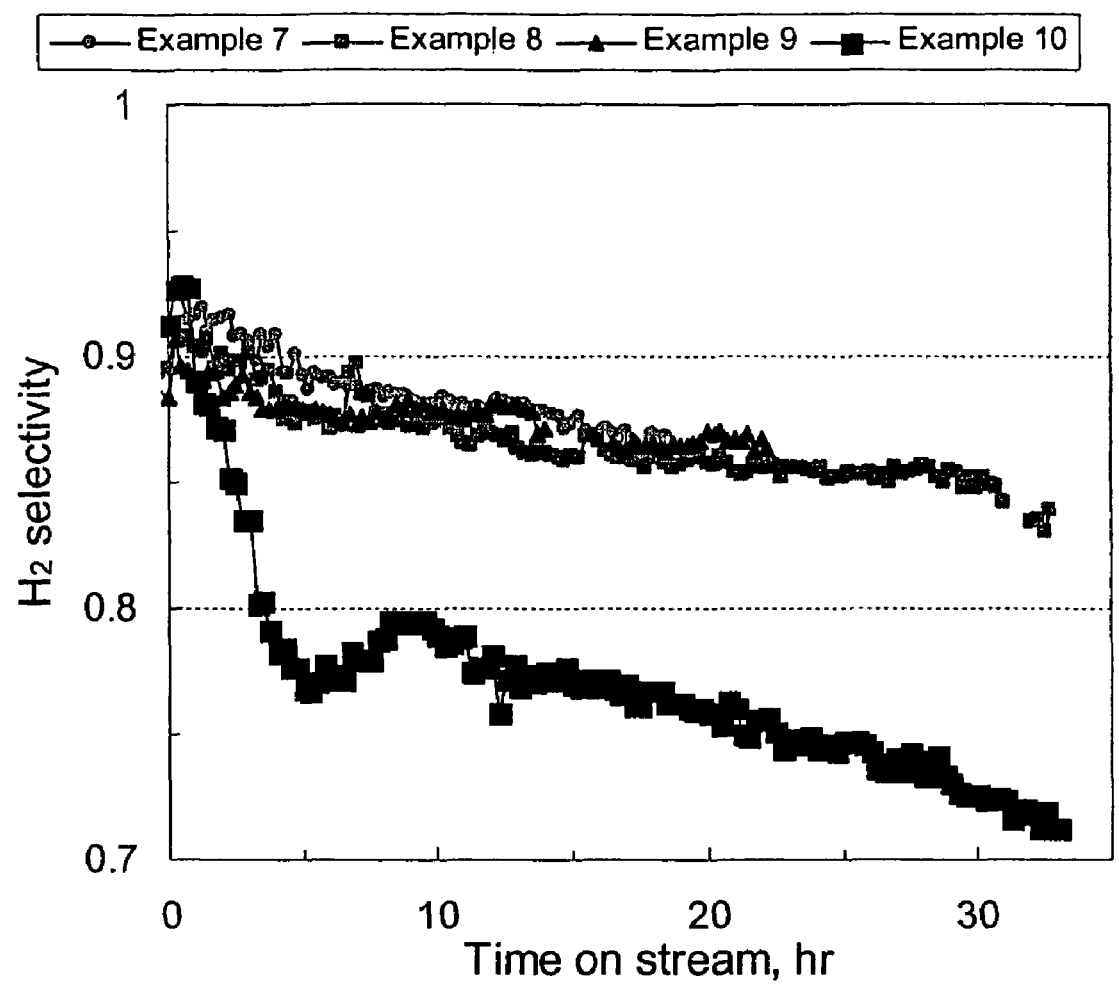
FIG. 2 is a graph showing the hydrogen selectivity for several example catalysts.
Figure 3:
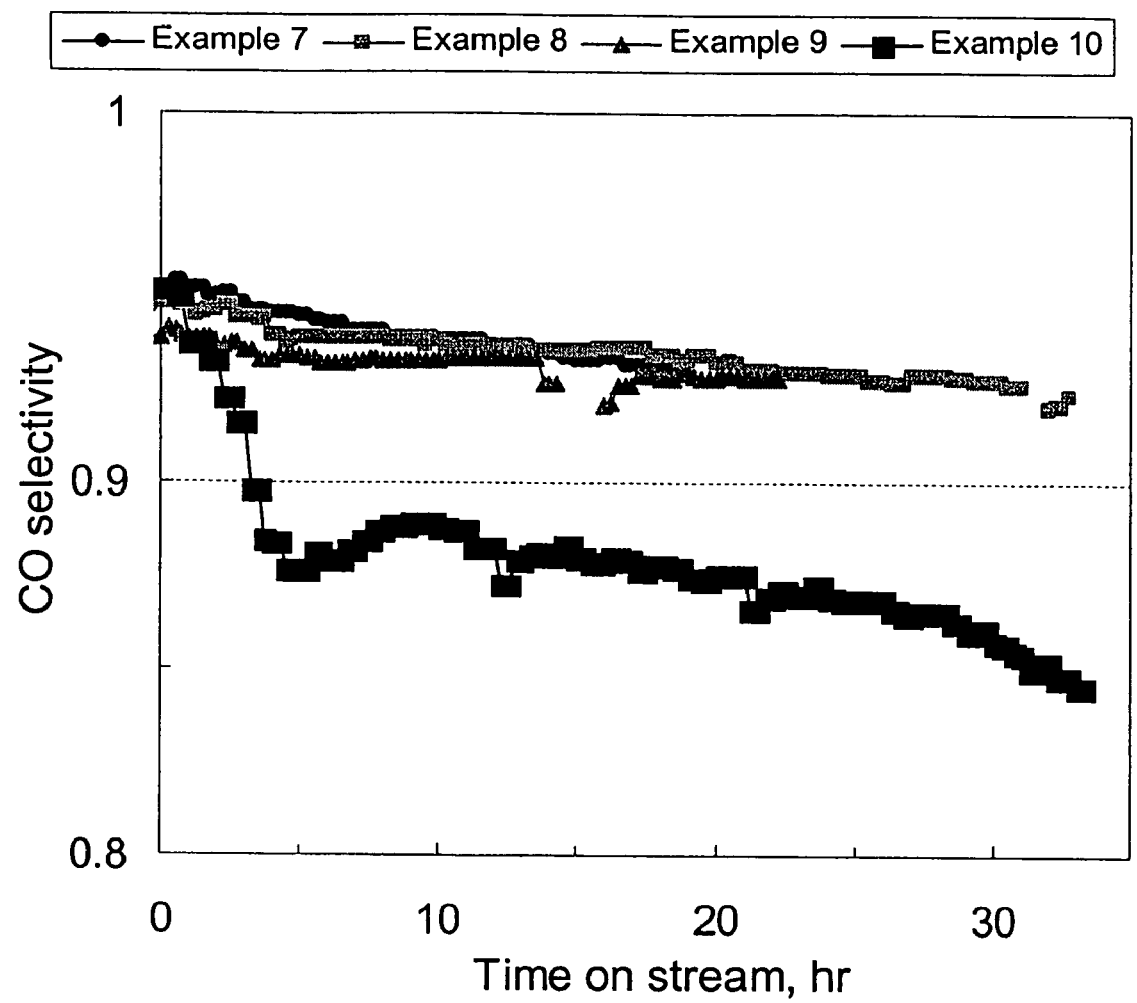
FIG. 3 is a graph showing carbon monoxide selectivity for several example catalysts.

FIGS. 1, 2, 3 shows the plots of the methane conversion, $H_2$ selectivity and CO selectivity for typical test runs of alloy catalyst Examples 7, 8, 9, and compared to a non-alloy catalyst Example 10, demonstrating the great stability in partial oxidation of natural gas, with less loss in methane conversion and product selectivity for the duration of the run (about 34 hours). More specifically, the initial drop in methane conversion, $H_2$ selectivity and CO selectivity in the first 5 hours of the test runs is not as pronounced or even present for the alloy catalysts compared to the non-alloy catalyst. Moreover the deactivation rate and rate of reactant selectivity loss (i.e. the slope of the curves) are reduced with most of the alloy catalysts.

The examples and testing data show that the catalyst compositions of the present invention are an improvement over prior art catalysts in their ability to resist or reduce deactivation over sustained time periods while maintaining high methane conversion and hydrogen and carbon monoxide selectivity values.

Accordingly, one of the preferred embodiments of the present invention is an improved method for converting a hydrocarbon containing gas and an atomic oxygen-containing gas to a gas mixture comprising hydrogen and carbon monoxide, i e., syngas. The process comprises using the improved catalyst compositions described herein in a partial oxidation reaction such as the syngas reaction described above. Further, the process can include using the improved method for producing liquid hydrocarbons by sending the syngas product to a synthesis reactor such as a Fischer-Tropsch or methanol reactor.

Syngas is typically at a temperature of about 600–1500° C. when leaving a syngas reactor. The syngas must be transitioned to be useable in a synthesis reactor, such as fro example, a Fischer-Tropsch reactor or an alcohol synthesis reactor which operate at lower temperatures of about 200° C. to 400° C. The syngas is typically cooled, dehydrated (i.e., taken below 100° C. to knock out water) and compressed during the transition phase. Thus, in the transition of syngas from the syngas reactor to the synthesis reactor, the syngas stream may experience a temperature window of 50° C. to 1500° C.

The synthesis reactor is preferably a Fischer-Tropsch reactor. The Fischer-Tropsch reactor can comprise any of the Fischer-Tropsch technology and/or methods known in the art. The Fischer-Tropsch feedstock is hydrogen and carbon monoxide, i.e., syngas. The hydrogen to carbon monoxide molar ratio is generally deliberately adjusted to a desired ratio of approximately 2:1, but can vary between 0.5 and 4. The syngas is then contacted with a Fischer-Tropsch catalyst. Fischer-Tropsch catalysts are well known in the art and generally comprise a catalytically active metal, a promoter and a support structure. The most common catalytic metals are Group VIII metals, such as cobalt, nickel, ruthenium, and iron or mixtures thereof. The support is generally alumina, titania, zirconia, silica, or mixtures thereof. Fischer-Tropsch reactors use fixed and fluid type conventional catalyst beds as well as slurry bubble columns. The literature is replete with particular embodiments of Fischer-Tropsch reactors and Fischer-Tropsch catalyst compositions. As the syngas feedstock contacts the catalyst, the hydrocarbon synthesis reaction takes place. The Fischer-Tropsch product contains a wide distribution of hydrocarbon products from C5 to greater than C100. The Fischer-Tropsch process is typically run in a continuous mode. In this mode, the gas hourly space velocity through the reaction zone typically may range from about 50 to about 10,000 $hr^{-1}$, preferably from about 300 $hr^{-1}$ to about 2,000 $hr^{-1}$. The gas hourly space velocity defined as the volume of reactants per time per reaction zone volume. The volume of reactant gases is at standard pressure of 1 atm or 101 kPa and standard temperature of 0° C. The reaction zone volume is defined by the portion of the reaction vessel volume where reaction takes place and which is occupied by a gaseous phase comprising reactants, products, and/or inerts; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C. The reaction zone pressure is typically in the range of about 80 psia (552 kPa) to about 1000 psia (6895 kPa), more preferably from 80 psia (552 kPa) to about 600 psia (4137 kPa), and still more preferably, from about 140 psia (965 kPa) to about 500 psia (3447 kPa).

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all issued patents, patent applications and publications cited herein are incorporated by reference. The discussion of certain references in the Description of Related Art, above, is not an admission that they are prior art to the present invention, especially any references that may have a publication date after the priority date of this application.

What is claimed is:

1. A process for producing synthesis gas comprising:
converting at least a portion of a feedstream comprising a hydrocarbon-containing gas and an atomic oxygen-containing gas over a syngas catalyst, under operating conditions comprising a pressure greater than or equal to 2 atmospheres, said operating conditions being effective to produce a gas steam comprising hydrogen and carbon monoxide, with a carbon monoxide selectivity equal to or greater than 80% after at least 48 hours of operation,
wherein the syngas catalyst comprises a metal catalyst material comprising a rhodium alloy comprising rhodium and at least one second metal selected from the group consisting of ruthenium, rhenium, niobium, tantalum and mixtures thereof, and wherein the rhodium alloy is substantially free of nickel.

2. The process according to claim 1 wherein the at least one second metal in the rhodium alloy comprises rhenium.

3. The process according to claim 1 wherein the at least one second metal in the rhodium alloy comprises ruthenium.

4. The process according to claim 1 wherein the rhodium alloy increases the melting point of the metal catalyst material to a temperature above 1964° C.

5. The process according to claim 1 wherein the hydrocarbon-containing gas comprises methane or natural gas.

6. The process according to claim 1 wherein the atomic oxygen-containing gas comprises diatomic oxygen, water, carbon dioxide, and combinations thereof.

7. The process according to claim 1 wherein the atomic oxygen-containing gas comprises diatomic oxygen.

8. The process according to claim 1 wherein the conversion step comprises partial oxidation, steam reforming, day reforming, oxidative dehydrogenation, or combinations over said syngas catalyst.

9. The process according to claim 1 wherein the process exhibits a hydrocarbon conversion equal to or greater than 80%, and a hydrogen selectivity equal to or greater than 80%, after at least 48 hours under operating conditions of at least greater than or equal to 2 atmospheres.

10. The process according to claim 1 wherein the process exhibits a hydrocarbon conversion equal to or greater than 85%, and a hydrogen selectivity equal to or greater than 85%, after at least 48 hours under operating conditions of at least greater than or equal to 2 atmospheres.

11. The process according to claim 1 wherein the catalyst comprises from about 1 percent to about 10 percent of the second metal by weight of the catalyst; and between 1 and 10 percent of rhodium by weight of the catalyst.

12. The process according to claim 1 wherein the catalyst comprises from about 2 percent to about 8 percent of the second metal by weight of the catalyst.

13. The process according to claim 1 wherein the catalyst comprises from about 2 percent to about 8 percent of rhodium by weight of the catalyst.

14. The process according to claim 1 wherein the at least one second metal in the rhodium alloy further comprises a metal selected from the group consisting of tungsten, zirconium and mixtures thereof.

15. The process according to claim 1 wherein the second metal is selected from the group consisting of ruthenium, rhenium and mixtures thereof.

16. The process according to claim 1 wherein the rhodium alloy is supported by a refractory support comprising a material selected from the group consisting of modified alumina, partially-stabilized alumina, unmodified alumina, modified zirconia, partially-stabilized zirconia, unmodified zirconia, titania, and combinations thereof.

17. The process according to claim 16 wherein said refractory support comprises a material selected from the group consisting of modified alumina, zirconia, and combinations thereof.

18. The process according to claim 16 wherein said refractory support comprises a material selected from the group consisting of modified alumina, partially-stabilized alumina, unmodified alumina, and combinations thereof.

19. The process according to claim 18 wherein the catalyst, has a metal surface area per gram of catalyst from 0.62 square meter per grain of catalyst to 5.7 square meter per grain of catalyst.

20. The process according to claim 1 wherein the metal catalyst material further comprises at least one promoter, said promoter comprising an element selected from the group consisting of lanthanide metals, alkali earth metals, and combinations thereof.

21. The process according to claim 20 wherein said promoter comprises one element selected form the group consisting of La, Ce, Pr, Nd, Pm, Eu, Gd, Tb, Dy, Ho, Er, Tm, Yb, Lu, their corresponding oxides, their corresponding ions, and mixtures thereof.

22. The process according to claim 20 wherein said promoter comprises samarium.

23. The process according to claim 1 wherein the process further exhibits a hydrogen selectivity equal to or greater than 80%, after at least 48 hours under said operating conditions of at least greater than or equal to 2 atmospheres.

24. The process according to claim 1 wherein the process exhibits a carbon monoxide selectivity equal to or greater than 85%, and a hydrogen selectivity equal to or greater than 85%, after at least 48 hours under operating conditions of at least greater than or equal to 2 atmospheres.

25. The process according to claim 8 wherein the conversion step comprises partial oxidation over said syngas catalyst.

26. The process according to claim 1 wherein the gas stream comprising hydrogen and carbon monoxide is further reacted in a synthesis reactor under conditions effective to produce liquid hydrocarbons.

27. The process according to claim 1 wherein the rhodium alloy is supported by a refractory support comprising a material selected from the group consisting of modified alumina and partially-stabilized alumina, said modified alumina being modified with a modifying agent selected from the group consisting of aluminum, rare earth metals, alkali earth metals, transition metals, and combinations thereof.

28. The process according to claim 27 wherein said modified alumina is modified with a modifying agent selected from the group consisting of lanthanum, magnesium, aluminum, and combinations thereof.

29. A process for producing synthesis gas comprising:
converting at least a portion of a feedstream comprising a hydrocarbon-containing gas and an atomic oxygen-containing gas over a syngas catalyst, under conditions effective to produce a gas stream comprising hydrogen and carbon monoxide,
wherein the syngas catalyst comprises a metal catalyst material comprising a rhodium alloy comprising rhodium and at least one second metal selected from the group consisting of ruthenium, rhenium, and mixtures thereof,
wherein said rhodium alloy is substantially free of nickel;
wherein the rhodium alloy is supported by a modified alumina support; and further
wherein the process exhibits a hydrocarbon conversion equal to or greater than 80%, a carbon monoxide selectivity equal to or greater than 80%, and a hydrogen selectivity equal to or greater than 80%, after at least 48 hours under operating conditions comprising a pressure greater than or equal to 2 atmospheres.

30. The process according to claim 29 wherein said modified alumina is modified with a modifying agent selected from the group consisting of aluminum, rare earth metals, alkali earth metals, transition metals, and combinations thereof.

31. The process according to claim 29 wherein said modified alumina is modified with a modifying agent selected from the group consisting of lanthanum, magnesium, aluminum, and combinations thereof.

32. The process according to claim 29 wherein the rhodium alloy comprises rhenium.

33. The process according to claim 29 wherein the rhodium alloy comprises ruthenium.

34. The process according to claim 29 wherein the catalyst has a metal surface area equal to or greater than 0.8 square meter of metal per gram of catalyst.

35. The process according to claim 29 wherein the catalyst has a metal surface area per gram of catalyst from 0.8 square meter of metal per gram of catalyst to 5.7 square meter of metal per gram of catalyst.

36. The process according to claim 29 wherein the catalyst has a metal surface area per gram of metal from 7.7 square meter of metal per gram of metal and 16.7 square meter of metal per gram of metal.

37. The process according to claim 29 wherein the catalyst has a metal dispersion between 3.7% and 16.2%.

38. The process according to claim 29 wherein the support is in the shape of discrete structures having a maximum characteristic dimension from about 0.25 mm to 6.25 mm.

* * * * *

UNITED STATES PATENT AND TRADEMARK OFFICE
CERTIFICATE OF CORRECTION

PATENT NO. : 7,226,548 B2 Page 1 of 1
APPLICATION NO. : 10/706644
DATED : June 5, 2007
INVENTOR(S) : Shuibo Xie et al.

It is certified that error appears in the above-identified patent and that said Letters Patent is hereby corrected as shown below:

Title Page,
Item [75], Inventors, add the following:
  --Mary E. Wolf, Ponca City, OK (US),
  --Cemal Ercan, Tulsa, OK (US), and
  --Subhash Dutta, Stillwater, OK (US).--

Column 16
Line 65, "day" should read --dry--.

Column 17
Line 50, "clement" should read --element--.

Signed and Sealed this

Fourth Day of September, 2007

JON W. DUDAS
*Director of the United States Patent and Trademark Office*